(12) United States Patent
Koay et al.

(10) Patent No.: US 10,419,067 B1
(45) Date of Patent: Sep. 17, 2019

(54) GLOBAL RESISTOR CALIBRATION FOR TRANSCEIVERS

(71) Applicant: Xilinx, Inc., San Jose, CA (US)

(72) Inventors: Chin Yang Koay, Singapore (SG); Hongyuan Zhao, Singapore (SG); Siok Wei Lim, Singapore (SG); Kee Hian Tan, Singapore (SG)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/107,712

(22) Filed: Aug. 21, 2018

(51) Int. Cl.
*H04B 3/20* (2006.01)
*H04L 7/027* (2006.01)
*H04B 3/493* (2015.01)
*H04L 25/02* (2006.01)

(52) U.S. Cl.
CPC .............. *H04B 3/20* (2013.01); *H04B 3/493* (2015.01); *H04L 7/0276* (2013.01); *H04L 25/0278* (2013.01)

(58) Field of Classification Search
CPC ....... H04B 3/20; H04B 3/493; H04L 25/0278; H04L 7/0276
USPC ......................................................... 375/219
See application file for complete search history.

(56) References Cited

U.S. PATENT DOCUMENTS

| | | |
|---|---|---|
| 6,586,964 B1 | 7/2003 | Kent et al. |
| 6,765,377 B1 | 7/2004 | Lu |
| 6,946,849 B1 * | 9/2005 | Lu .............................. H03F 1/42 324/601 |
| 8,004,308 B2 * | 8/2011 | Santurkar .......... H03K 19/0005 326/30 |
| 8,415,979 B2 * | 4/2013 | Chao ................ H03K 19/00384 326/82 |
| 8,451,021 B1 * | 5/2013 | Fox ..................... H04L 25/0278 326/21 |
| 8,710,810 B1 * | 4/2014 | McJimsey ........... H02M 3/1584 323/272 |

(Continued)

OTHER PUBLICATIONS

Chan, Kok Lim et al., "A 32.75-Gb/s Voltage-Mode Transmitter With Three-Tap FFE in 16-nmCMOS," Oct. 2017, pp. 2663-2678, vol. 52, No. 10. IEEE, Piscataway, New Jersey, USA.

*Primary Examiner* — Juan A Torres
(74) *Attorney, Agent, or Firm* — Patterson + Sheridan, LLP

(57) ABSTRACT

Apparatus and associated methods relate to a programmable resistor having a resistance iteratively programmed by a calibration control loop. In an illustrative example, the calibration control loop may alternately sample the programmable resistance and a reference resistance by producing a corresponding voltage drop across the resistors. The voltage drops may, for example, be induced by the same constant current source. The calibration control loop may compare the voltage drops with a comparator, for example. In some examples, the comparator may provide a count direction signal to a logic block, generating a calibration code. The calibration code may, for example, be applied to the programmable resistor, such that the resistance of the programmable resistor iteratively approaches the resistance of the reference resistor. Various programmable resistors within a calibration control loop may, for example, substantially improve termination impedances of high-speed transmission lines and may mitigate random resistive mismatch variations.

20 Claims, 10 Drawing Sheets

(56) References Cited

U.S. PATENT DOCUMENTS

| | | | | |
|---|---|---|---|---|
| 2005/0248382 A1* | 11/2005 | Chung | ............... | H03F 3/4508 |
| | | | | 327/362 |
| 2007/0188187 A1* | 8/2007 | Oliva | ............... | H04L 25/0278 |
| | | | | 326/30 |
| 2015/0127288 A1* | 5/2015 | Coursey | ............... | G01K 7/20 |
| | | | | 702/99 |

* cited by examiner

US 10,419,067 B1

GLOBAL RESISTOR CALIBRATION FOR TRANSCEIVERS

TECHNICAL FIELD

Various embodiments relate generally to transmission line impedance.

BACKGROUND

Modern networks are responsible for interconnecting computing devices operable to exchange data. Data may be exchanged from circuit to circuit on a common circuit board or from circuit board to circuit board along a common backplane, for example, in a computer or server. In some implementations, data may be exchanged over long distances, for example, from a travel agent's computer to an airline server on a cloud network. Modern networks may employ a number of mediums including physical wires, radio frequency (RF) channels or fiber optics. Data exchanged between computing devices may include data packets including multiple bits.

When high-speed digital data is exchanged using differential pairs, the link between a transmitter and a receiver may form a transmission line. High-speed transmission lines may be characterized for their characteristic impedance. Reflections within the transmission line may be minimized when signals traveling a length of transmission line experience a substantially continuous characteristic impedance. Termination resistors may be employed at the ends of various transmission lines to provide impedance continuity. Minimizing reflections may increase signal integrity of data traveling on a transmission line, which may advantageously decrease bit error rate, and may permit increases in transmission distance and/or transmission speed.

SUMMARY

Apparatus and associated methods relate to a programmable resistor having a resistance iteratively programmed by a calibration control loop. In an illustrative example, the calibration control loop may alternately sample the programmable resistance and a reference resistance by producing a corresponding voltage drop across the resistors. The voltage drops may, for example, be induced by the same constant current source. The calibration control loop may compare the voltage drops with a comparator, for example. In some examples, the comparator may provide a count direction signal to a logic block, generating a calibration code. The calibration code may, for example, be applied to the programmable resistor, such that the resistance of the programmable resistor iteratively approaches the resistance of the reference resistor. Various programmable resistors within a calibration control loop may, for example, substantially improve termination impedances of high-speed transmission lines and may mitigate random resistive mismatch variations.

Various embodiments may achieve one or more advantages. For example, some embodiments may enable digital high-speed circuits to operate with higher signal integrity. Higher signal integrity may reduce bit-error-rate (BER) and/or may allow systems to communicate at a faster data rate without compromising the BER. Some embodiments may automatically calibrate an on-chip programmable termination resistor upon chip power up. In some examples, the on-chip programmable termination resistor may be continuously or periodically calibrated. In some implementations, the on-chip programmable termination resistor may be calibrated to an accuracy dictated by a control loop resolution. Various implementations may be implemented in substantially small areas. Some implementations may be substantially unaffected by amplifier offset voltages and/or currents. Some exemplary implementations may substantially cancel amplifier offset.

In an exemplary aspect, a resistor calibrator apparatus may include a programmable resistor (ROCP) coupled to a first reference potential and providing an adjustable resistance responsive to a resistance control signal. The resistor calibrator apparatus may include a constant current source (I1) coupled to a second reference potential (GND). The resistor calibrator apparatus may include a first switching network (S3, S4) comprising a first switch (S3) and a second switch (S4), the first switching network (S3, S4) configured to selectively connect the first reference potential (+V) to the constant current source (I1), in a first mode, through a reference resistor (RREF), and, in a second mode, through the programmable resistor (ROCP). The resistor calibrator apparatus may include a second switching network (S1, S2) configured to selectively connect an amplifier input node, in the first mode, to the node that couples RREF to the first switch (S3), and, in the second mode, to the node that couples ROCP to the second switch (S4). The resistor calibrator apparatus may include an amplifier (U2) configured to buffer a monitored signal at the amplifier input node and output the buffered monitored signal to an amplifier output node. The resistor calibrator may include a third switching network (S5, S7) configured to selectively charge the amplifier output node, in the first mode, to a first capacitor (C1), and, in the second mode, to a second capacitor (C2). The resistor calibrator apparatus may include a comparator (U1) coupled at its inputs to the first capacitor (C1) and the second capacitor (C2), respectively, and to compare, in a third mode, a voltage stored on the first capacitor (C1) and a voltage stored on the second capacitor (C2), and to generate, based on the comparison, a direction signal indicative of which of the programmable resistor (ROCP) and the reference resistor (RREF) has a greater resistance. The resistor calibrator apparatus may include a programming signal generator (U3) configured to update the resistance control signal based on a logical value of the received direction signal.

The programming signal generator (U3) may be configured to generate the resistance control signal in response to a received clock signal (COMP_INT). The resistance control signal may include a programmable code. The programming signal generator (U3) may be configured to generate the programmable code according to the received direction signal and in response to the received clock signal. The programming signal generator (U3) may be configured to increment the programmable code in response to first polarity edges of the received clock signal when the received direction signal is in a first logic state. The programming signal generator (U3) may be configured to decrement the programmable code in response to an edge of the received clock signal when the received direction signal is in a second logic state.

The resistor calibrator apparatus may include a sequence control circuit configured to operate the first, second and third switching networks in a predetermined sequence. The sequence control circuit may be configured to iteratively operate until the logical value of the direction control signal changes based upon the comparison of the comparator (U1). The sequence control circuit may be configured to iteratively operate until a predetermined period of time has passed. The programming signal generator (U3) may be configured to update the resistance control signal by increasing the resistance of the programmable resistor (ROCP) in response to a first logical value of the received direction signal. The programming signal generator (U3) may be configured to update the resistance control signal by decreasing the resistance of the programmable resistor (ROCP) in response to a second logical value of the received direction signal.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

To aid understanding, this document is organized as follows. First, an exemplary programmable integrated circuit (IC) on which the disclosed circuits and processes may be implemented is briefly introduced with reference to FIG. 1. Second, with reference to FIG. 2 an exemplary global resistor calibrator is depicted implemented in a SERDES application. Next, with reference to FIGS. 3-10, the discussion turns to various exemplary embodiments.

Figure 1:
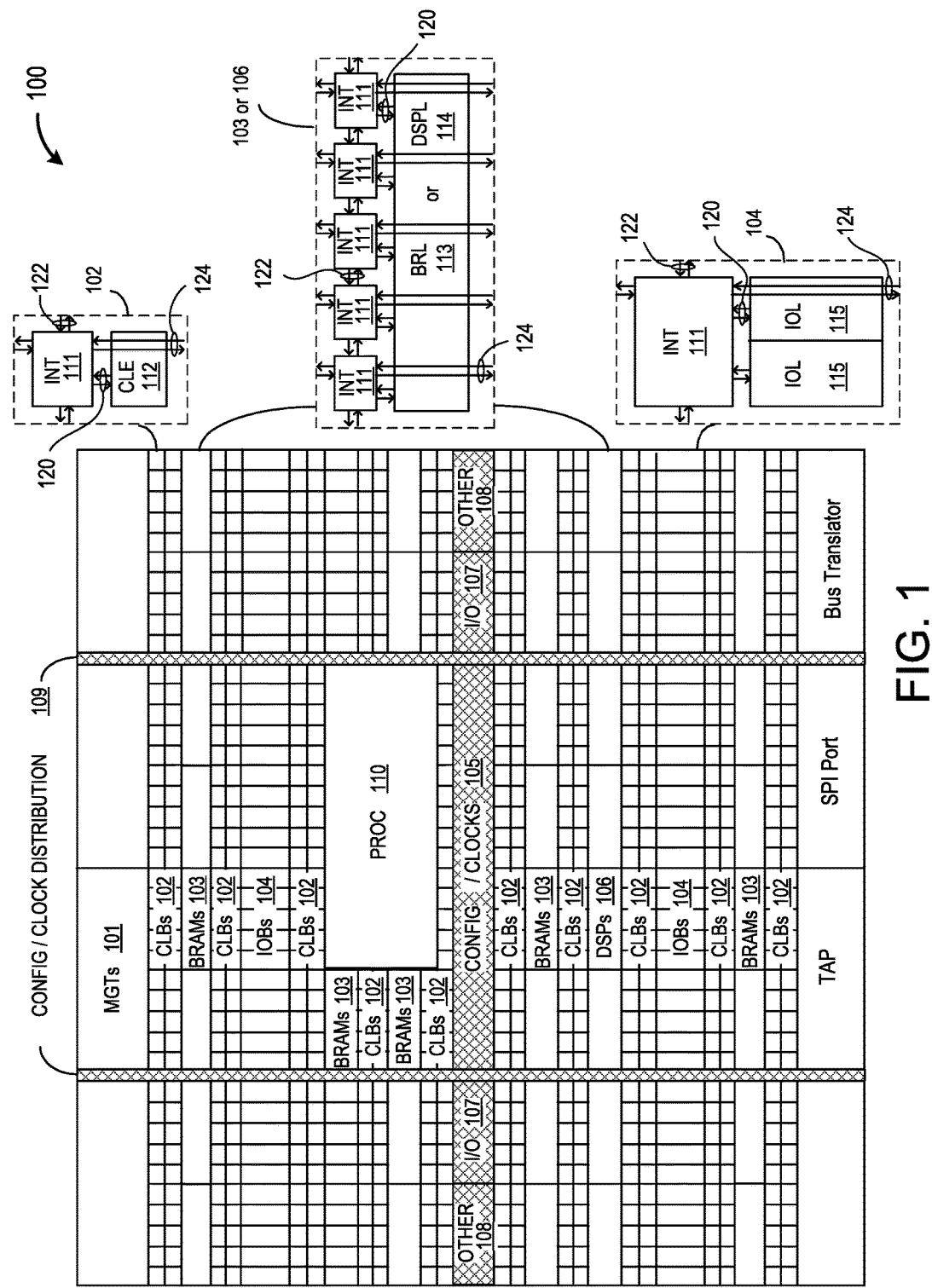
FIG. 1 depicts an exemplary programmable integrated circuit (IC) on which the disclosed circuits and processes may be implemented.

FIG. 1 depicts an exemplary programmable integrated circuit (IC) on which the disclosed circuits and processes may be implemented. A programmable IC 100 includes FPGA logic. The programmable IC 100 may be implemented with various programmable resources and may be referred to as a System on Chip (SOC). Various examples of FPGA logic may include several diverse types of programmable logic blocks in an array.

For example, FIG. 1 illustrates a programmable IC 100 that includes a large number of different programmable tiles including multi-gigabit transceivers (MGTs) 101, configurable logic blocks (CLBs) 102, blocks of random access memory (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., clock ports), and other programmable logic 108 (e.g., digital clock managers, analog-to-digital converters, system monitoring logic). The programmable IC 100 includes dedicated processor blocks (PROC) 110. The programmable IC 100 may include internal and external reconfiguration ports (not shown).

In various examples, a serializer/deserializer may be implemented using the MGTs 101. The MGTs 101 may include various data serializers and deserializers. Data serializers may include various multiplexer implementations. Data deserializers may include various demultiplexer implementations.

In some examples of FPGA logic, each programmable tile includes a programmable interconnect element (INT) 111 having standardized inter-connections 124 to and from a corresponding interconnect element in each adjacent tile. Therefore, the programmable interconnect elements taken together implement the programmable interconnect structure for the illustrated FPGA logic. The programmable interconnect element INT 111 includes the intra-connections 120 to and from the programmable logic element within the same tile, as shown by the examples included in FIG. 1. The programmable interconnect element INT 111 includes the inter-INT-connections 122 to and from the programmable interconnect element INT 111 within the same tile, as shown by the examples included in FIG. 1.

For example, a CLB 102 may include a configurable logic element (CLE) 112 that may be programmed to implement user logic, plus a single programmable interconnect element INT 111. A BRAM 103 may include a BRAM logic element (BRL) 113 and one or more programmable interconnect elements. In some examples, the number of interconnect elements included in a tile may depend on the height of the tile. In the pictured implementation, a BRAM tile has the same height as five CLBs, but other numbers (e.g., four) may also be used. A DSP tile 106 may include a DSP logic element (DSPL) 114 and one or more programmable interconnect elements. An IOB 104 may include, for example, two instances of an input/output logic element (IOL) 115 and one instance of the programmable interconnect element INT 111. The actual I/O bond pads connected, for example, to the I/O logic element 115, may be manufactured using metal layered above the various illustrated logic blocks, and may not be confined to the area of the input/output logic element 115.

In the pictured implementation, a columnar area near the center of the die (shown shaded in FIG. 1) is used for configuration, clock, and other control logic. Horizontal areas 109 extending from the column distribute the clocks and configuration signals across the breadth of the programmable IC 100. Note that the references to "columnar" and "horizontal" areas are relative to viewing the drawing in a portrait orientation.

Some programmable ICs utilizing the architecture illustrated in FIG. 1 may include additional logic blocks that disrupt the regular columnar structure making up a large part of the programmable IC. The additional logic blocks may be programmable blocks and/or dedicated logic. For example, the processor block PROC 110 shown in FIG. 1 spans several columns of CLBs 102 and BRAMs 103.

FIG. 1 illustrates an exemplary programmable IC architecture. The numbers of logic blocks in a column, the relative widths of the columns, the number and order of columns, the types of logic blocks included in the columns, the relative sizes of the logic blocks, and the interconnect/logic implementations are provided purely as examples. For example, in an actual programmable IC, more than one adjacent column of CLBs 102 may be included wherever the CLBs 102 appear, to facilitate the efficient implementation of user logic.

In various examples, the MGTs 101 may drive differential pairs of transmission lines. In order to mitigate transmission reflections, the transmission lines may be terminated with a termination resistor to match, as closely as possible, the impedance of the transmission line. The resistance of the termination resistors may be adjusted by a global resistor calibrator implemented in a global resistor calibration control loop.

Figure 2:
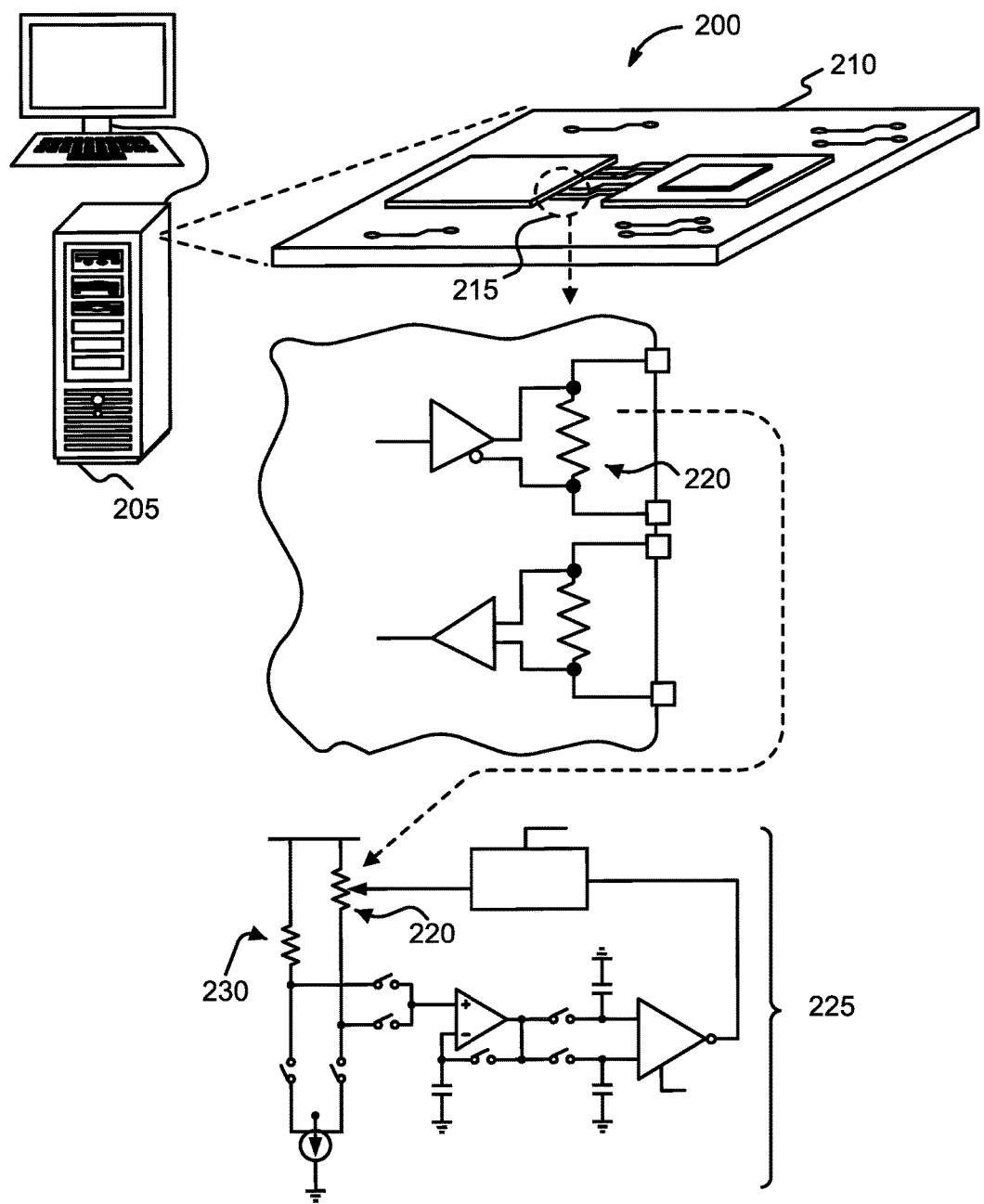
FIG. 2 depicts an exemplary global resistor calibrator implemented in a high-speed digital computing system.

FIG. 2 depicts an exemplary global resistor calibrator implemented in a high-speed digital computing system. A high-speed digital computing system 200 is exploded to varying levels of detail. The high-speed digital computing system 200 includes a server 205. The server 205 includes multiple interconnected circuit boards, one of which is a serializer/deserializer (SERDES) card 210. The SERDES card 210 includes several high-speed transmission lines 215. Each of the transmission lines 215 terminate at a termination resistor 220. The resistance of the termination resistors 220 are adjusted by a global resistor calibrator 225 to substantially match a reference resistor 230. In various high-speed transmission lines, for example, SERDES applications, the termination resistors 220 may be programmable resistors having a resistance iteratively programmed by a calibration control loop.

Figure 3:
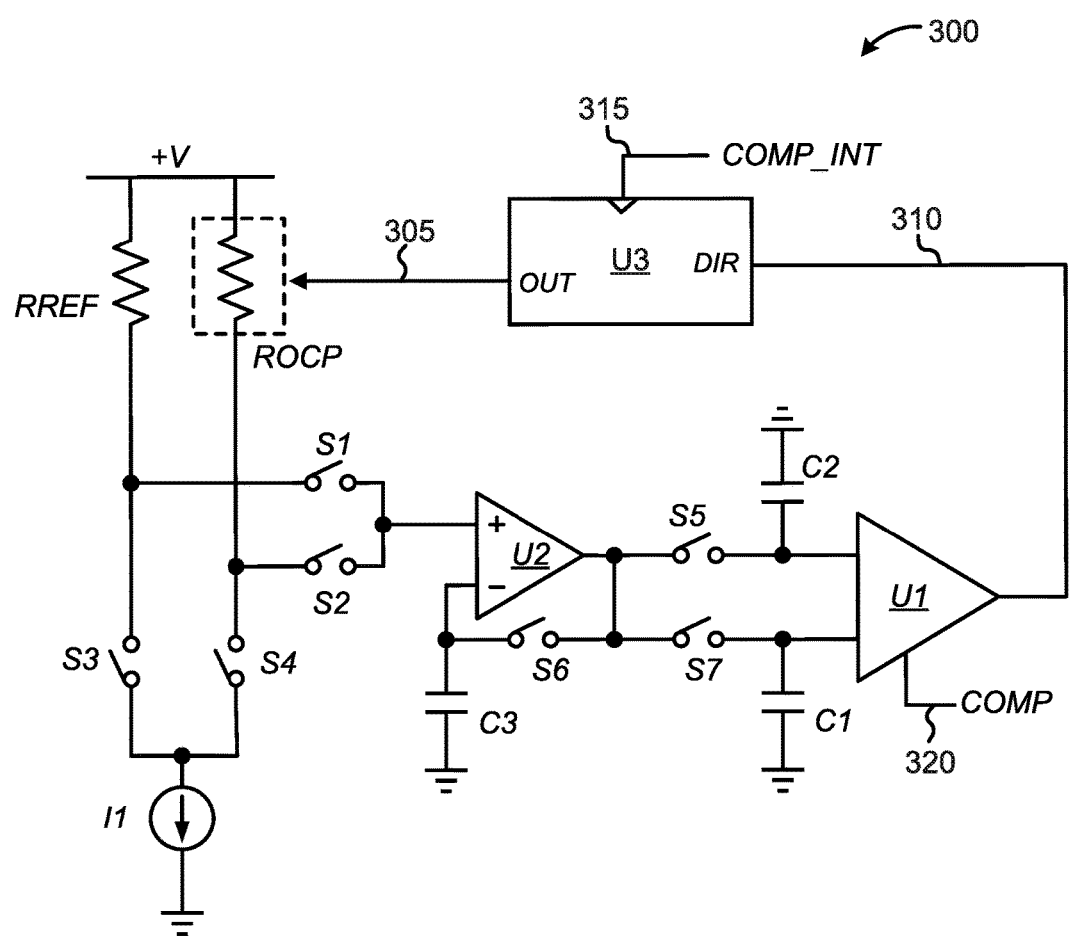
FIG. 3 depicts a schematic view of an exemplary global resistor calibration control loop.

FIG. 3 depicts a schematic view of an exemplary global resistor calibration control loop. In the illustrated Figure, a global resistor calibration control loop circuit 300 includes a supply rail (V+) connected to supply a current source (I1) through two parallel branch circuits. One of the branch circuits is a reference resistor RREF in series with a first switch (S3). The other branch circuit is a programmable resistor ROCP in series with a second switch (S4). In some embodiments, the ROCP may be an on-chip programmable resistor, for example. The circuit 300 is configured to iteratively modify ROCP in a direction needed to reduce the difference in the voltage drops across RREF and ROCP until the resistance of ROCP substantially matches the resistance of RREF within a tolerance of the components of the circuit 300.

The voltage drops induced across RREF and ROCP, respectively, are sampled during non-overlapping time periods. The voltage across RREF is monitored through a switch S1 when S3 is closed and S4 is open. The voltage across ROCP is monitored through a switch S2 when S4 is closed and S3 is open. The switches S1 and S2 connect to a first, non-inverting input of amplifier (e.g., op-amp) U2. An output of U2 connects to switches S5, S6 and S7.

Switch S5 selectively connects the output of U2 to a first input of a comparator U1, and a terminal of a capacitor C2 that has its other terminal connected to a reference potential (e.g., circuit ground). Switch S6 selectively connects the output of U2 to an inverting input of the amplifier U2, and a terminal of a capacitor C3 that has its other terminal connected to the reference potential. Switch S7 selectively connects the output of U2 to a second input of the comparator U1, and a terminal of a capacitor C1 that has its other terminal connected to the reference potential.

In the depicted embodiment, the comparator U1 generates at its output a direction signal 310 in response to receiving a COMP enable signal 320 at a control input. The direction signal 310 is received by a direction input of a programming signal generator U3, which may be implemented in hardware as a circuit. In some embodiments, the programming signal generator U3 may be implemented as a processor executing a program of instructions, alone or in combination with hardware. The state (e.g., low or high) of the direction signal 310 may be interpreted by the programming signal generator U3 as a control signal indicating whether to increment or decrement the resistance value of ROCP. In response to a COMP_INT clock signal 315 at a clock input of U3, the programming signal generator U3 may generate a programming signal 305 defining an output code signal configured to be received by and change the resistance value of the ROCP.

In operation, the ROCP is programmed with the programming signal 305 generated by the programming signal generator U3. The programming signal 305 may be a numerical code, for example. The programming signal generator U3 may increment or decrement the numerical code in response to the direction signal 310 and the clock signal 315.

The direction signal 310 is determined by the comparator U1 in response to a switching network, which includes the depicted switches and capacitors. The network is configured to sample a voltage on the ROCP and on a reference resistor RREF. The network, in conjunction with the comparator U1, may be configured to produce an "up" signal (e.g., logic 1) on the direction signal 310 when the resistance of ROCP is less than the resistance of RREF. Conversely, the network in conjunction with the comparator U1 may be configured to produce a "down" (e.g., logic 0) on the direction signal 310 when the resistance of ROCP is greater than the resistance of RREF. In various implementations, the global resistor calibration circuit 300 may operate by configuring the states of the switches S1-S7 in a series of phases that may be iteratively repeated until a condition has been satisfied.

For example, in a first phase, switches S1, S3, S5, S6 and S7 are closed (e.g., activated) and switches S2 and S4 are opened (e.g., deactivated). A voltage at the supply rail V+ minus the voltage across the reference resistor RREF is transferred to capacitors C1, C2 and C3. The amplifier U2 may behave as a unity gain stage, for example, and may provide the drive current to charge the capacitors C1, C2 and C3 rapidly. The amplifier U2 may have a substantially high input impedance to present substantially negligible load (e.g., buffer) while monitoring each of the resistor nodes.

In a second phase, switches S2, S4 and S5 are closed (e.g., activated) and switches S1, S3, S6 and S7 are opened (e.g., deactivated). With switch S6 open, the amplifier U2 operates as a comparator. A rail voltage V+ minus the voltage across the on-chip programmable resistor ROCP compared to the voltage on capacitor C3, which from the first phase is the voltage at the supply rail V+ minus the voltage across the reference resistor RREF. Since the same amplifier U2 is used to make both measurements, the input offset voltage of the amplifier U2 is substantially cancelled out. In this phase, the output of the amplifier U2 generates an output that is the difference between the resistors ROCP and RREF times the current source I1 times the open loop gain A of the amplifier U2. The voltage transferred to C2 is then:

$$V(U2)=V(C2)=A*I1*(RREF-ROCP)$$

When the open loop gain A of the amplifier U2 is substantially high, the voltage on the output of U2 will be near the supply rail (+V) when ROCP is less than RREF. Conversely, the voltage on the output of U2 will be near the reference potential (e.g., ground) when ROCP is greater than RREF. The voltage at C2 at the end of this phase will be near the supply rail when ROCP<RREF, and near the reference potential when ROCP>RREF.

In a third phase, the voltage across C1, determined in the first phase, and the voltage across C2, determined in the second phase, are compared with the comparator U1. The comparator U1 is enabled with an enable signal 320. The comparator U1 generates the direction signal 310 that is a function of the difference between the voltages on C1 and C2. A voltage on C2 that is greater than the voltage on C1 may be indicative of a resistance of ROCP less than the resistance of RREF. In this case, the comparator may generate a "up" signal on the direction signal 310. Conversely, a voltage on C2 that is less than the voltage on C1 may be indicative of a resistance of ROCP greater than the resistance of RREF. In this case, the comparator may generate an "down" signal on the direction signal 310. The direction signal 310 is coupled to the programming signal generator U3. In some embodiments, the clock signal 315 and the enable signal 320 may be the same.

In some embodiments, RREF may be located external to a semiconductor die containing the other components depicted in FIG. 3. An externally located RREF may advantageously allow implementation flexibility of resistance tolerance and/or temperature coefficient. In some examples, RREF may be incorporated on the same die as the other components. Same die implementation may advantageously provide the benefits described without an additional circuit board component.

Figure 4:
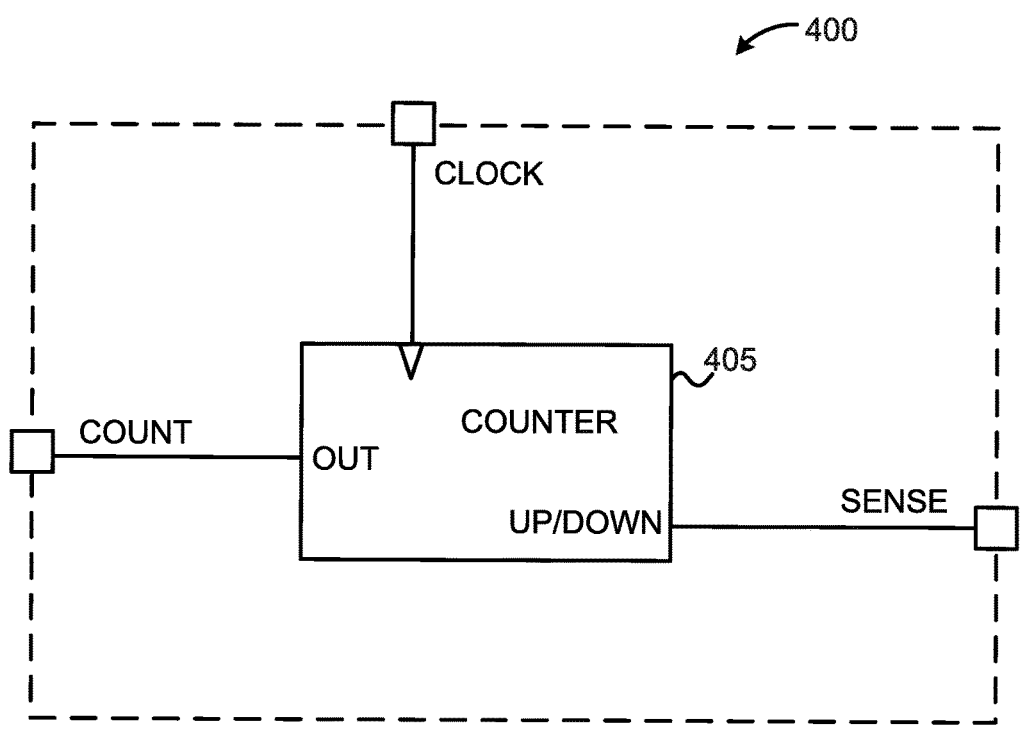
FIG. 4 depicts a schematic view of an exemplary calibration code generator implemented in a global resistor calibration control loop.

FIG. 4 depicts a schematic view of an exemplary calibration code generator implemented in a global resistor calibration control loop. A calibration code generator 400 includes an up/down counter 405. The up/down counter 405 is coupled on an input to a sense input terminal SENSE. The up/down counter 405 is coupled on an input to a clock input terminal CLOCK. The up/down counter 405 is coupled on an output to a count output terminal COUNT. The calibration code generator 400 may be included in the programming signal generator U3. The calibration code generator 400 may be implemented in hardware, software or may be implemented in FPGA fabric, for example.

In operation, the calibration code generator 400 may include a dynamic count value. When the sense input terminal SENSE is in a first logic state, each clocking edge of the clock input terminal CLOCK may increment the dynamic count value. Conversely, when the sense input terminal SENSE is in a second logic state, each clocking edge of the clock input terminal CLOCK may decrement the dynamic count value. The dynamic count value may be driven out of the count output terminal COUNT. The calibration code generator 400 may be included in the programming signal generator U3 (FIG. 3) and may control the resistance of ROCP (FIG. 3).

Figure 5:
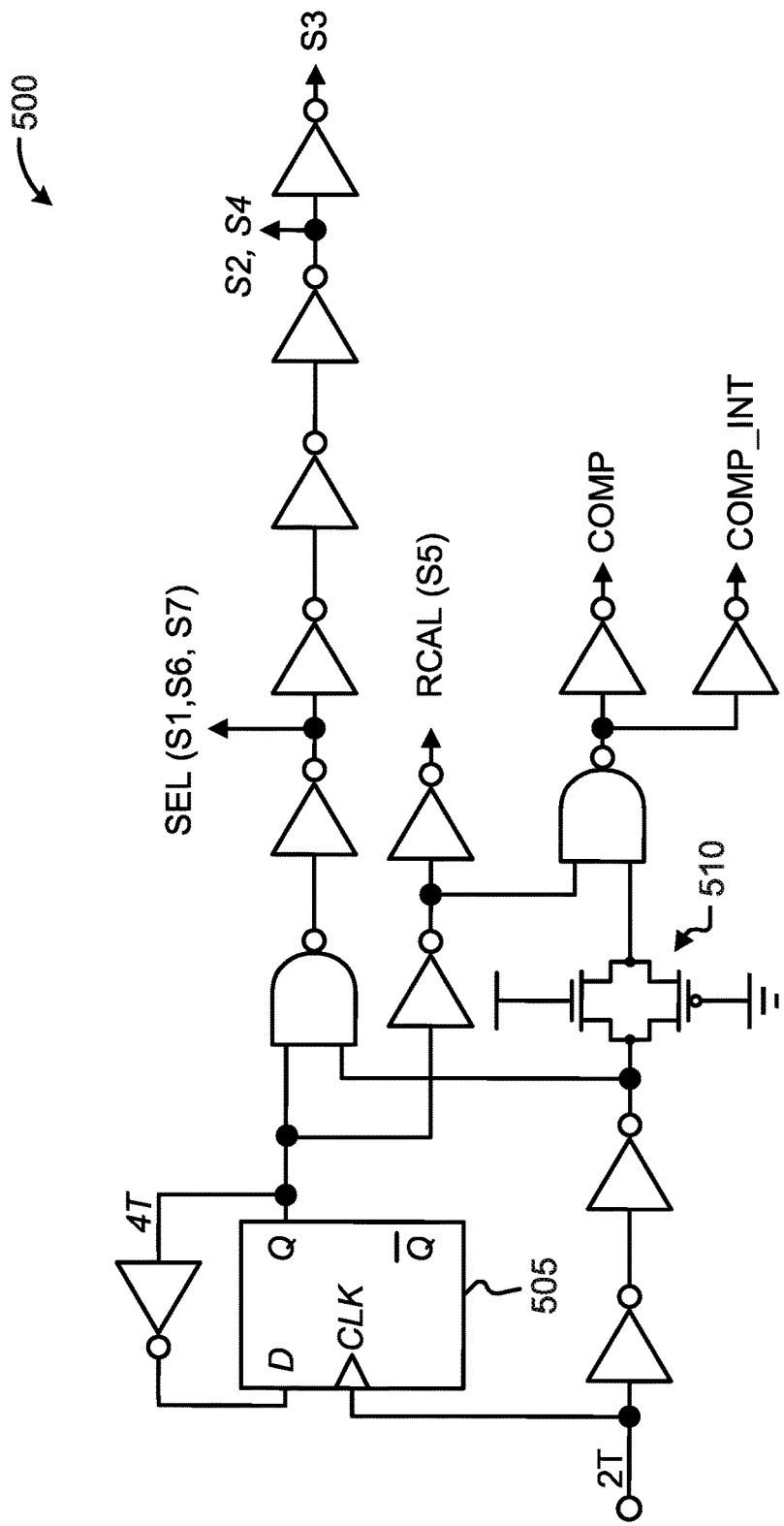
FIG. 5 depicts a schematic view of an exemplary timing controller implemented in a global resistor calibration control loop.
Figure 6:
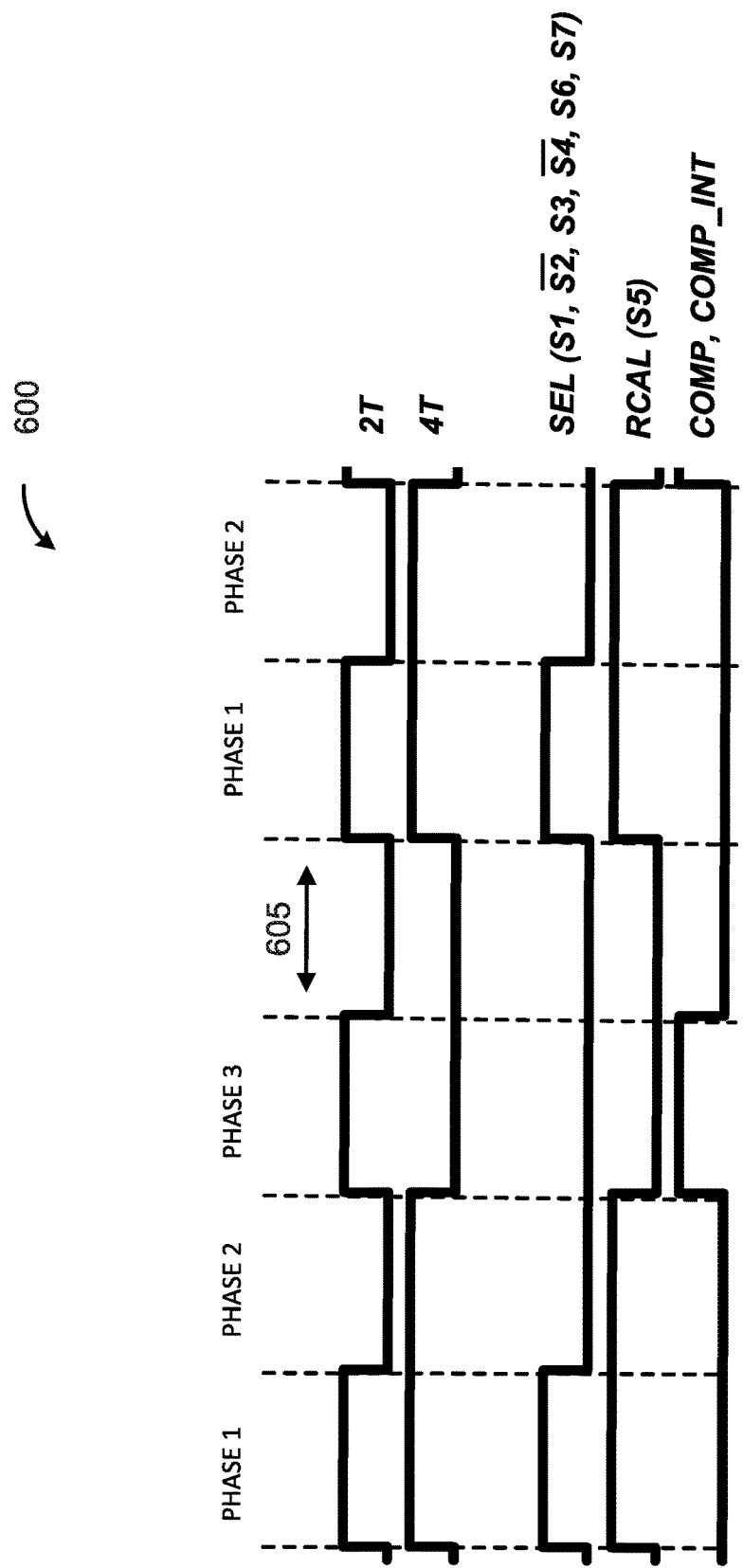
FIG. 6 depicts a simulated timing diagram of an exemplary timing controller implemented in a global resistor calibration control loop.

FIG. 5 depicts a schematic view of an exemplary timing controller implemented in a global resistor calibration control loop. A timing controller 500 includes an exemplary logic circuit to implement a logic timing scheme such as depicted in FIG. 6. The timing controller 500 activates (e.g., closes) switches S1-S7 (FIG. 3) when the associated logic signals S1-S7 (FIG. 5) are TRUE. Conversely, the timing controller 500 deactivates switches S1-S7 (FIG. 3) when the associated logic signals S1-S7 (FIG. 5) are FALSE. The timing controller 500 is clocked by a clock signal operably coupled to a clock input 2T. The clock input 2T frequency is divided in half by a flip flop 505. The flip flop 505 drives the half frequency clock signal 4T. When both the clock signals 2T and 4T are TRUE, switches S1, S3, S6 and S7 are activated. When one or both the clock signals 2T and 4T are FALSE, switches S1, S3, S6 and S7 are deactivated. Switch S2 activates opposite switch S1. Switch S4 activates opposite switch S3. Switch S5 activates in unison with clock signal 4T, such that when clock signal 4T is TRUE, switch S5 activates, and when clock signal 4T is FALSE switch S5 is deactivated.

The COMP signal enables a comparator, such as comparator U1 (FIG. 3). In some examples, the output of the comparator U1 may remain unchanged (e.g., latched) when the enable signal is FALSE. Accordingly, when the enable signal is TRUE, the comparator U1 may actively evaluate the inputs and provide an associated logic output. COMP_INT signal clocks a programming signal generator such as programming signal generator U3 (FIG. 3).

In the depicted example of FIG. 5, the COMP enable signal and the COMP_INT clock signal both become TRUE when the clock signal 4T becomes TRUE, with a slight delay according to a delay circuit 510. The slight delay may allow the switches to settle and the capacitors to charge before the direction and count determinations are made with the COMP and COMP_INT signals.

FIG. 6 depicts a simulated timing diagram of an exemplary timing controller implemented in a global resistor calibration control loop. A timing diagram 600 includes three phases PHASE 1, PHASE 2 and PHASE 3. The three phases repeat iteratively with an interphase period 605. The waveforms, phases and signal names reflect the descriptions with reference to FIGS. 3 and 5.

Figure 7:
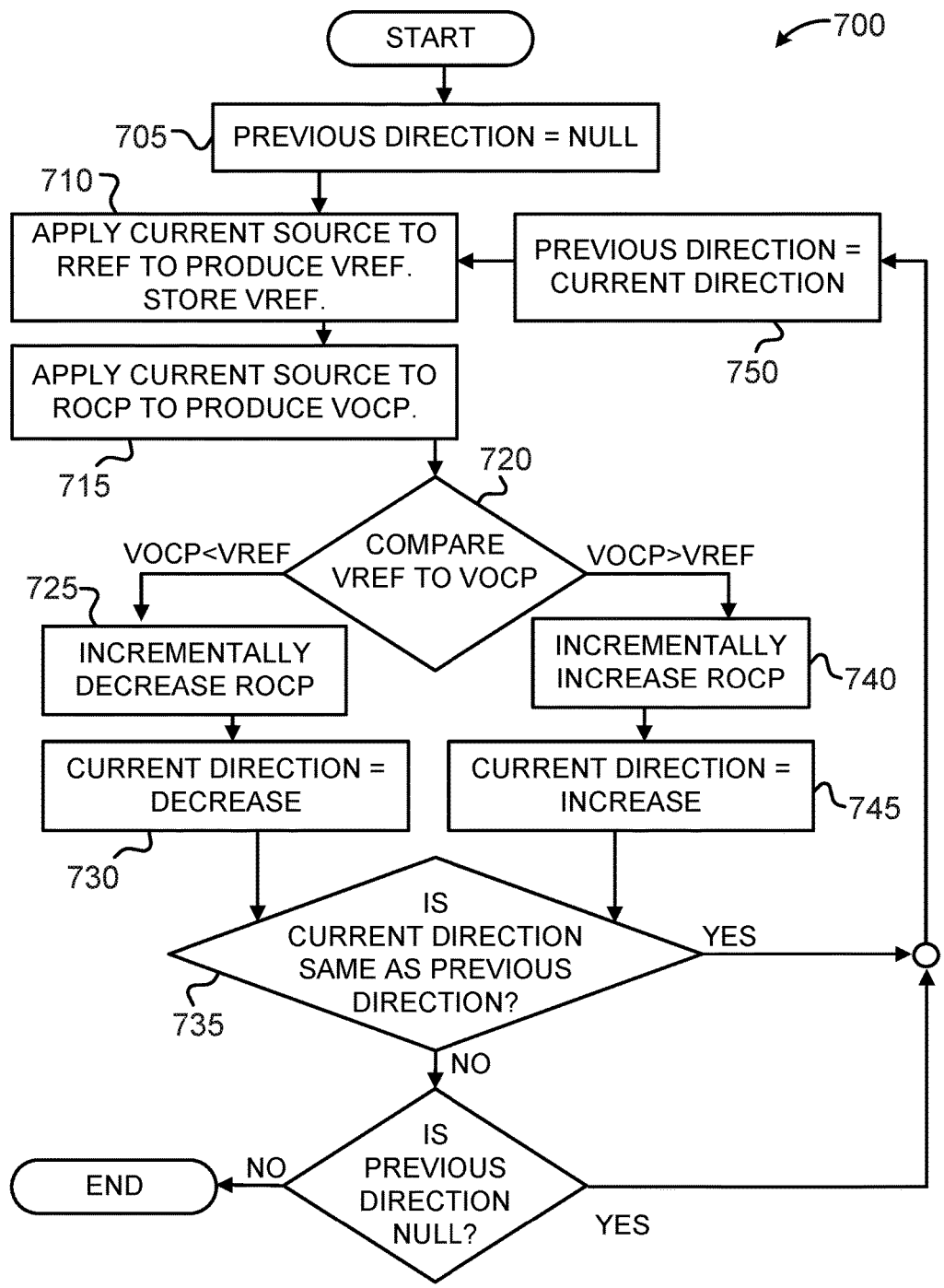
FIGS. 7, 8, 9 and 10 depict flowcharts of an exemplary global resistor calibration control loop method.

FIG. 7 depicts a flowchart of an exemplary global resistor calibration control loop method. A global resistor calibration control loop method 700 may be implemented, for example, by the circuit 300 (FIG. 3). In this exemplary implementation, the method 700 may be performed one time, or may be performed episodically as needed, or according to a predetermined schedule. In this example, the method iterates until a condition is satisfied, such as, for example, that the ROCP resistance has been changed in a corrective direction to match RREF, until the adjusted value of ROCP has overshot the equal resistance point. This condition can be detected, for example, because the sign of the correction, or the logical level of the directional signal 310, for example, has inverted. At that point, the ROCP and RREF may be determined to be substantially equal within the tolerances (e.g., offset, drift, accuracy) of the components of the circuit 300 (FIG. 3).

The method 700 includes a process block 705, in which a previous direction variable is initialized to NULL. The method 700 continues to process block 710, where a current source is selectively applied to a reference resistor RREF to produce a voltage VREF. The method 700 continues to process block 715, where the current source is selectively applied to an on-chip programmable termination resistor ROCP to produce a voltage VOCP. The method 700 continues to decision block 720 where the voltages VREF and VOCP are compared.

At decision block 720 if VOCP is less than VREF, then the method 700 proceeds to process block 725. At process block 725 the method 700 incrementally decreases the resistance value of ROCP. Next at process block 730 a current direction variable is set to DECREASE. The method 700 then proceeds to decision block 735.

At decision block 720 if VOCP is greater than VREF, then the method 700 proceeds to process block 740. At process block 740 the method 700 incrementally increases the resistance value of ROCP. Next at process block 745 the current direction variable is set to INCREASE. The method 700 then proceeds to decision block 735.

At decision block 735, the method 700 evaluates the current direction and the previous direction variables. If the current direction is the same as the previous direction, then more resistance compensation may be provided to the on-chip programmable resistor ROCP. Accordingly, the method 700 proceeds to process block 750. At process block 750, the previous direction variable is given the value of the current direction variable and the process iterates again by proceeding to process block 710.

If, at decision block 735, the current direction is not the same as the previous direction, then the method 700 proceeds to decision block 755. At decision block 755 the method 700 evaluates the value of the previous direction variable.

If, at decision block 755, the previous direction is NULL, then the method 700 is on its first iteration, having no previous direction. In this case, the method 700 proceeds to process block 750 to repeat the method 700.

If, at decision block 755, the previous direction is not NULL then the on-chip programmable termination resistor ROCP has achieved a resistance that is substantially the same as the reference resistor RREF, and the method 700 is exited.

Figure 8:
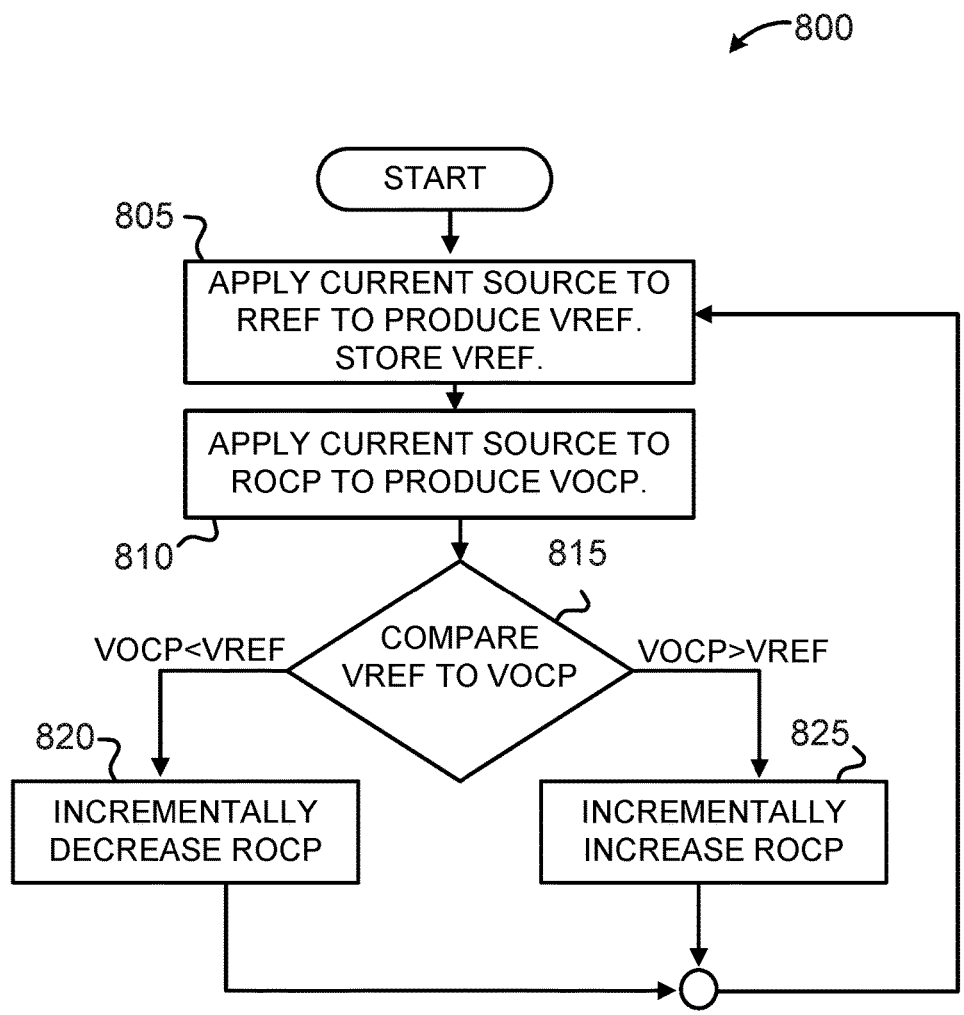

FIG. 8 depicts a flowchart of an exemplary global resistor calibration control loop method. A global resistor calibration control loop method 800 may be implemented, for example, by the circuit 300 (FIG. 3). In this exemplary implementation, the method 800 may be performed continuously, or may be performed for a predetermined period of time. The method may be repeated, for example, on each startup or reset of the system in which the circuit resides (e.g., the system 200 of FIG. 2), or according to a predetermined schedule, or in response to certain parameters (e.g., exceed temperature threshold). In this example, the method 800 iterates and converges to operate in a dithering condition where the value of ROCP dithers above and below the value of RREF while the method 800 is executed. At that point, the ROCP and RREF may be determined to be substantially equal within the tolerances (e.g., offset, drift, accuracy) of the components of the circuit 300.

The method 800 includes a process block 805, in which a constant current source (e.g., I1) is selectively applied to a reference resistor RREF to produce a voltage VREF. The method 800 continues to process block 810, where the current source is selectively applied to an on-chip programmable termination resistor ROCP to produce a voltage VOCP. The method 800 continues to decision block 815 where the voltages VREF and VOCP are compared.

At decision block 815 if VOCP is less than VREF, then the method 800 proceeds to process block 820. At process block 820 the method 800 incrementally decreases the resistance value of ROCP. The method 800 then proceeds back to process block 805.

At decision block 815 if VOCP is greater than VREF, then the method 800 proceeds to process block 825. At process block 825 the method 800 incrementally increases the resistance value of ROCP. The method 800 then proceeds back to process block 805.

After arriving at a determination of the value for ROCP, the value of the programming signal 305 (e.g., a resistance control signal) may be stored, for example, in a non-volatile memory. Future executions of the methods 700, 800 may be initialized by retrieving the stored value of the programming signal 305 (e.g., resistance control signal) from the non-volatile memory.

Figure 9:
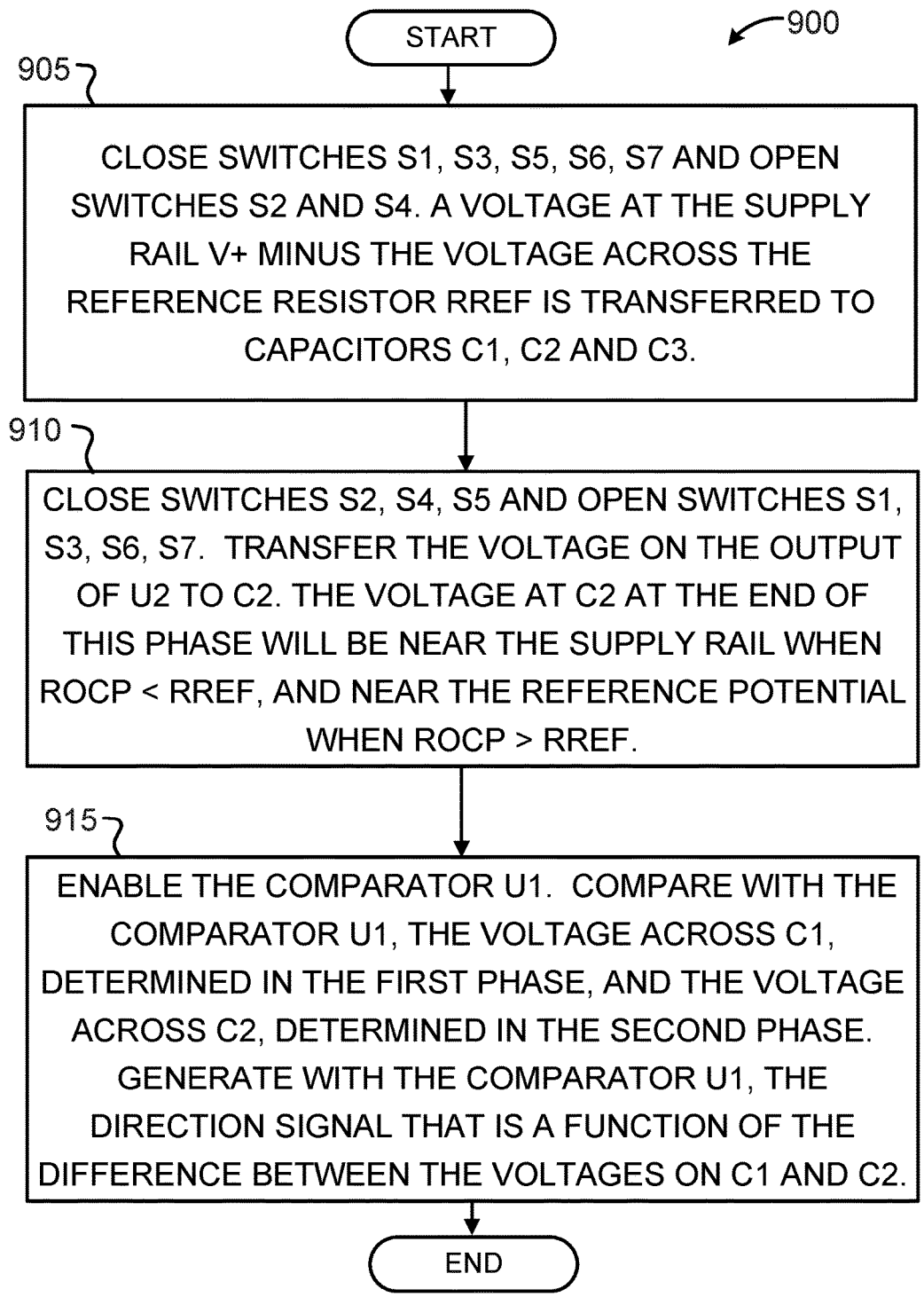

FIG. 9 depicts a flowchart of an exemplary global resistor calibration control loop method. A global resistor calibration control loop method 900 may be implemented, for example, by the circuit 300 (FIG. 3). In a first phase 905, switches S1, S3, S5, S6 and S7 are closed (e.g., activated) and switches S2 and S4 are opened (e.g., deactivated). A voltage at the supply rail V+ minus the voltage across the reference resistor RREF is transferred to capacitors C1, C2 and C3. The amplifier U2, which may behave, in some implementations, as a linear preamplifier, such as a high input-impedance, non-inverting or inverting, unity gain stage, for example, and may provide the drive current to charge the capacitors C1, C2 and C3 rapidly. The amplifier U2 may have a substantially high input impedance to present substantially negligible load (e.g., buffer) while monitoring each of the resistor nodes. In some embodiments, the amplifier U2 may provide a non-linear (e.g., exponential, hyperbolic) gain, and the gain may be more or less than unity.

In a second phase 910, switches S2, S4 and S5 are closed (e.g., activated) and switches S1, S3, S6 and S7 are opened (e.g., deactivated). With switch S6 open, the amplifier U2 operates as a comparator. A rail voltage V+ minus the voltage across the on-chip programmable resistor ROCP compared to the voltage on capacitor C3, which from the first phase is the voltage at the supply rail V+ minus the voltage across the reference resistor RREF. Since the same amplifier U2 is used to make both measurements, the input offset voltage of the amplifier U2 is substantially cancelled out. In this phase, the output of the amplifier U2 generates an output that is the difference between the resistors ROCP and RREF times the current source I1 times the open loop gain A of the amplifier U2. The voltage transferred to C2 is then:

$$V(U2)=V(C2)=A*I1*(RREF-ROCP)$$

When the open loop gain A of the amplifier U2 is substantially high, the voltage on the output of U2 will be near the supply rail (+V) when ROCP is less than RREF. Conversely, the voltage on the output of U2 will be near the reference potential (e.g., ground) when ROCP is greater than RREF. The voltage at C2 at the end of this phase will be near the supply rail when ROCP<RREF, and near the reference potential when ROCP>RREF.

In a third phase 915, the voltage across C1, determined in the first phase, and the voltage across C2, determined in the second phase, are compared with the comparator U1. The comparator U1 is enabled with an enable signal 320. The comparator U1 generates the direction signal 310 that is a function of the difference between the voltages on C1 and C2. A voltage on C2 that is greater than the voltage on C1 may be indicative of a resistance of ROCP less than the resistance of RREF. In this case, the comparator may generate a "up" signal on the direction signal 310. Conversely, a voltage on C2 that is less than the voltage on C1 may be indicative of a resistance of ROCP greater than the resistance of RREF. In this case, the comparator may generate an "down" signal on the direction signal 310.

Figure 10:
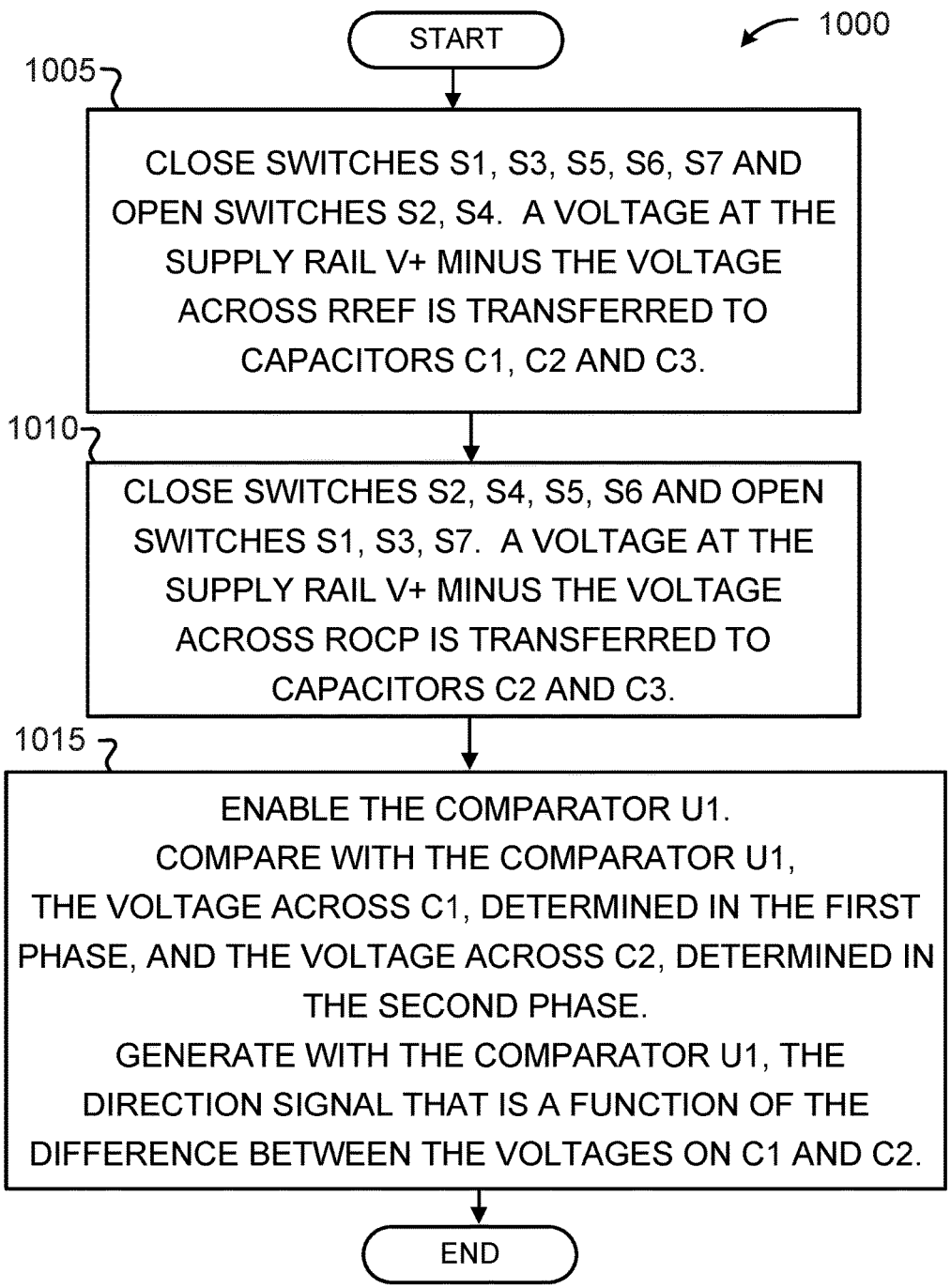

FIG. 10 depicts a flowchart of an exemplary global resistor calibration control loop method. A global resistor calibration control loop method 1000 may be implemented, for example, by the circuit 300 (FIG. 3). In a first phase 1005, switches S1, S3, S5, S6 and S7 are closed (e.g., activated) and switches S2 and S4 are opened (e.g., deactivated). A rail voltage V+ minus the voltage across the reference resistor RREF is transferred to capacitors C1, C2 and C3. A preamp U2 provides the drive current to charge the capacitors C1, C2 and C3 rapidly. The preamp U2 has a substantially high input impedance to present substantially negligible load on the resistor nodes.

In a second phase 1010, switches S2, S4 S5 and S6 are closed (e.g., activated) and switches S1, S3 and S7 are opened (e.g., deactivated). A rail voltage V+ minus the voltage across the on-chip programmable resistor ROCP is transferred to capacitors C2 and C3.

In a third phase 1015, the voltage across C1 (e.g., a function RREF) and across C2 (e.g., a function of ROCP) are compared with the comparator U1. The comparator U1 is enabled with an enable signal 320. The comparator U1 generates the direction signal 310 that is a function of the difference between the voltages on C1 and C2. A voltage on C2 that is less than the voltage on C1 may be indicative of a resistance of ROCP greater than the resistance of RREF. In this case, the comparator may generate a "down" signal on the direction signal 310. Conversely, a voltage on C2 that is greater than the voltage on C1 may be indicative of a resistance of ROCP less than the resistance of RREF. In this case, the comparator may generate an "up" signal on the direction signal 310.

Although various embodiments have been described with reference to the figures, other embodiments are possible. For example, some global resistor calibrators may run at chip start-up, and/or may run subsequent to a chip reset, which may advantageously mitigate interference of the calibrator with data transceivers. Some examples of global resistor calibrators may run continuously, which may advantageously provide continuous adjustments to termination resistors providing high quality signal integrity, for example, over process, voltage and temperature (PVT). Various examples of global resistor calibrators may run periodically, for example, the calibrators may run when a bit error rate (BER) exceeds a predetermined threshold and/or when a sensed temperature exceeds a predetermined threshold. Some global resistor calibrators may, for example, monitor a direction signal for a change, and once the direction signal changes a predetermined number of times, the calibrator may stop, leaving a programmable resistor at an achieved resistance.

In some embodiments, various resistor technologies may be employed. For example, a reference resistor may be thin film, thick film, laser trimmed, monolithic or wire-wound, for example. The reference resistor may be co-located with a global resistor calibrator or may be remotely located.

In some implementations, various comparators may be configured as quantizers. In various examples, various comparators may be slicers. Further, various comparators may be implemented with an analog-to-digital converter (ADC).

Various global resistor calibrators may be implemented as an array. For example, a programmable resistor may be implemented multiple times and connected in parallel, series or in combination.

Various examples of programmable resistors may include an R2R ladder, or a digital potentiometer, implemented alone or in combination. Some examples of programmable resistors may be multiple fixed resistors in series or parallel networks, for example. Each resistor, for example, may be associated with a switch operable to connect the associated resistor in or out of the circuit.

Various examples of current sources may include current mirrors, such as may be implemented on a monolithic wafer. Some examples of current sources may be implemented in a control loop employing, for example, transistors and/or operational amplifiers.

Various embodiments may be implemented programmable hardware fabric such as on a field programmable gate array device. For example, the embodiment of FIG. 4 may be implemented in an FPGA.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs). In some embodiments, the module(s) may involve execution of preprogrammed instructions and/or software executed by a processor. For example, various modules may involve both hardware and software.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A resistor calibrator apparatus, the apparatus comprising:
    a programmable resistor (ROCP) coupled to a first reference potential and providing an adjustable resistance responsive to a resistance control signal;
    a constant current source coupled to a second reference potential;
    a first switching network comprising a first switch and a second switch, the first switching network configured to selectively connect the first reference potential to the constant current source, in a first mode, through a reference resistor (RREF), and, in a second mode, through the programmable resistor (ROCP);
    a second switching network configured to selectively connect an amplifier input node, in the first mode, to a node that couples RREF to the first switch, and, in the second mode, to a node that couples ROCP to the second switch;
    an amplifier configured to buffer a monitored signal at the amplifier input node and output the buffered monitored signal to an amplifier output node;
    a third switching network configured to selectively charge the amplifier output node, in the first mode, to a first capacitor, and, in the second mode, to a second capacitor;
    a comparator coupled at its inputs to the first capacitor and the second capacitor, respectively, and to compare, in a third mode, a voltage stored on the first capacitor and a voltage stored on the second capacitor, and to generate, based on the comparison, a direction signal indicative of which of the programmable resistor (ROCP) and the reference resistor (RREF) has a greater resistance; and,
    a programming signal generator configured to update the resistance control signal based on a logical value of the generated direction signal.

2. The apparatus of claim 1, wherein the programming signal generator is further configured to generate the resistance control signal in response to a received clock signal.

3. The apparatus of claim 1, further comprising a sequence control circuit configured to operate the first, second and third switching networks in a predetermined sequence.

4. The apparatus of claim 1, wherein the programming signal generator is further configured to update the resistance control signal by increasing the resistance of the programmable resistor (ROCP) in response to a first logical value of the received direction signal.

5. The apparatus of claim 2, wherein the resistance control signal comprises a programmable code, the programming signal generator further configured to generate the programmable code according to the received direction signal and in response to the received clock signal.

6. The apparatus of claim 3, wherein the sequence control circuit is configured to iteratively operate until the logical value of the direction control signal changes based upon the comparison of the comparator.

7. The apparatus of claim 3, wherein the sequence control circuit is configured to iteratively operate until a predetermined period of time has passed.

8. The apparatus of claim 4, wherein the programming signal generator is further configured to update the resistance control signal by decreasing the resistance of the programmable resistor (ROCP) in response to a second logical value of the received direction signal.

9. The apparatus of claim 5, wherein the programming signal generator is further configured to increment the programmable code in response to first polarity edges of the received clock signal when the received direction signal is in a first logic state.

10. The apparatus of claim 5, wherein the programming signal generator is further configured to decrement the programmable code in response to an edge of the received clock signal when the received direction signal is in a second logic state.

11. A resistor calibration method, the method comprising:
    coupling a programmable resistor (ROCP) to a first reference potential and providing an adjustable resistance responsive to a resistance control signal;
    coupling a constant current source to a second reference potential;
    selectively connecting with a first switching network comprising a first switch and a second switch, the first reference potential to the constant current source, in a first mode, through a reference resistor (RREF), and, in a second mode, through the programmable resistor (ROCP);
    selectively connecting with a second switching network, an amplifier input node, in the first mode, to a node that couples RREF to the first switch, and, in the second mode, to a node that couples ROCP to the second switch;
    buffering with an amplifier, a monitored signal at the amplifier input node and output the buffered monitored signal to an amplifier output node;
    selectively charging with a third switching network, the amplifier output node, in the first mode, to a first capacitor, and, in the second mode, to a second capacitor;
    coupling a comparator at its inputs to the first capacitor and the second capacitor, respectively, and to compare, in a third mode, a voltage stored on the first capacitor and a voltage stored on the second capacitor, and to generate, based on the comparison, a direction signal indicative of which of the programmable resistor (ROCP) and the reference resistor (RREF) has a greater resistance; and,
    updating with a programming signal generator, the resistance control signal based on a logical value of the generated direction signal.

12. The method of claim 11, further generating with the programming signal generator, the resistance control signal in response to a received clock signal.

13. The method of claim 11, further comprising operating, with a sequence control circuit, the first, second and third switching networks in a predetermined sequence.

14. The method of claim 11, further updating the resistance control signal by increasing the resistance of the programmable resistor (ROCP) in response to a first logical value of the received direction signal with the programming signal generator.

15. The method of claim 12, further comprising generating, with the programming signal generator, the resistance control signal comprising a programmable code, wherein the programmable code is generated according to the received direction signal and in response to the received clock signal.

16. The method of claim 13, iteratively operating until the logical value of the direction control signal changes based upon the comparison of the comparator with the sequence control circuit.

17. The method of claim 13, iteratively operating until a predetermined period of time has passed with the sequence control circuit.

18. The method of claim 14, further updating the resistance control signal by decreasing the resistance of the programmable resistor (ROCP) in response to a second logical value of the received direction signal with the programming signal generator.

19. The method of claim 15, further incrementing with the programming signal generator, the programmable code in response to first polarity edges of the received clock signal when the received direction signal is in a first logic state.

20. The method of claim 15, further decrementing with the programming signal generator, the programmable code in response to an edge of the received clock signal when the received direction signal is in a second logic state.

* * * * *